United States Patent [19]
Favreau et al.

[11] 3,923,320
[45] Dec. 2, 1975

[54] WAGON FOR TRANSPORTING AN ERECTED SCAFFOLD

[76] Inventors: Andre Favreau, 28 Durham St.; Marcel Houle, 61 Mansfield Place, both of Dollard des Ormeaux, Quebec, Canada

[22] Filed: Nov. 26, 1974

[21] Appl. No.: 527,298

[30] Foreign Application Priority Data
Mar. 5, 1974 Canada.............................. 194136

[52] U.S. Cl. ..................... 280/103; 182/17; 52/143
[51] Int. Cl.² ..................... B60P 3/00; B62D 21/06
[58] Field of Search ........ 280/103; 182/178, 17, 63; 52/111, 292, 143, 648, 293

[56] References Cited
UNITED STATES PATENTS

| | | | |
|---|---|---|---|
| 478,758 | 7/1892 | Paugh et al. | 280/103 |
| 2,295,183 | 9/1942 | Perreault | 182/178 |
| 2,311,988 | 2/1943 | Lavin | 52/143 |
| 2,360,999 | 10/1944 | Wyen | 182/17 |
| 2,402,579 | 6/1946 | Ross | 182/63 |
| 3,055,460 | 9/1962 | Maroney | 52/293 |
| 3,311,387 | 3/1967 | Klemm et al. | 280/103 |
| 3,315,976 | 4/1967 | Thiermann | 280/103 |
| 3,857,460 | 12/1974 | Nini | 182/17 |
| 3,881,749 | 5/1975 | Berends | 52/143 |

FOREIGN PATENTS OR APPLICATIONS
489,329  1/1953  Canada ............................. 280/103

*Primary Examiner*—Leo Friaglia
*Assistant Examiner*—Jack D. Rubenstein

[57] ABSTRACT

A wagon particularly adapted to transport a conventional metal scaffold in erected position thereon and which includes a front wheel and axle assembly, a rear wheel and axle assembly and bars pivotally interconnected and detachably connected at opposite ends to the front and rear assemblies respectively to allow relative tilting of the two assemblies and to permit dismantling of the wagon and transportation thereof along with the scaffold. Each assembly includes a pair of pins transversely adjustable relative to each other and engaging into the female bottom end of a scaffold section, a pair of laterally spaced-apart levelling jacks to level and stabilize the scaffold, and a pair of braking devices adjacent the corresponding wheels thereof respectively to hold the wagon still in a desired position. A steering assembly is associated to the front assembly to steer the wagon to the desired position. The wagon enables the displacement of an erected scaffold over uneven ground with the scaffold remaining upright and stable.

7 Claims, 7 Drawing Figures

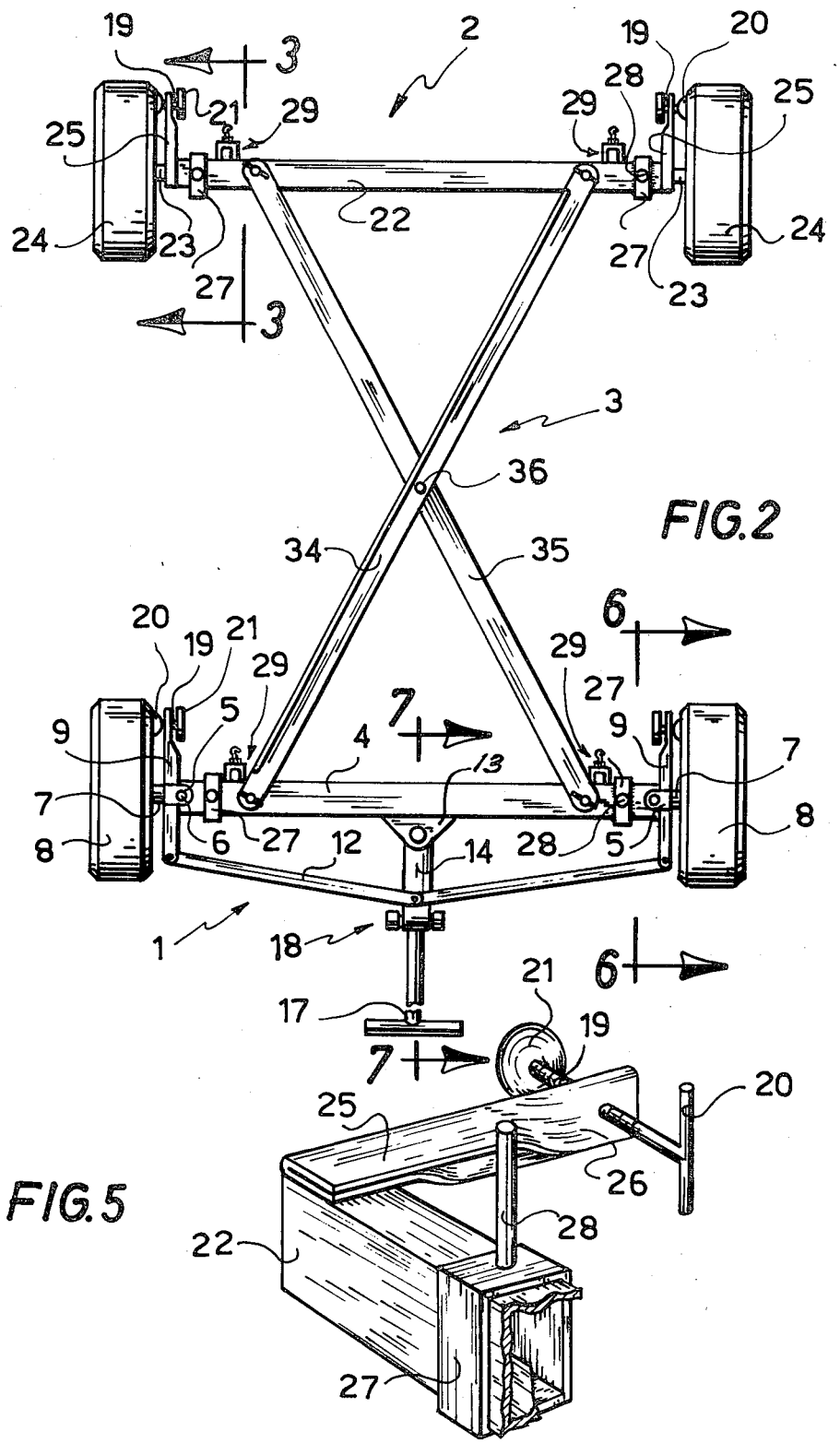

WAGON FOR TRANSPORTING AN ERECTED SCAFFOLD

This invention relates to a wagon and, more particularly, to a wagon of the type adapted to transport a scaffold in erected position theron.

Scaffolds are commonly used by electricians, painters, cleaning and maintenance crews, bricklayers, etc. The scaffolds which are now used are made of metal sections and tie rods which, in erected position, define four tubular posts each having an open bottom or female end. Mobility has heretofore been imparted to such scaffold by securing caster wheel units into the female ends of the four legs of the scaffold. The wheels of these caster wheel units are essentially of small diameter and, therefore, of real utility on rather smooth surfaces only, such as on a floor. Thus, the mobility of an erected scaffold remains a problem both indoor and outdoor where there are irregularities in the supporting surface.

It is a general object of the present invention to provide a wagon adapted to allow adequate mobility of a conventional metal scaffold over relatively uneven surfaces.

It is another object of the present invention to provide a wagon particularly adapted to carry a conventional metal scaffold in erected position thereon, adapted to be taken apart and transported along with the scaffold sections and parts, which includes levelling and stabilizing jacks, which adjusts to scaffolds having different spacings between the legs thereof, and which is steerable and adapted to remain still at the selected site or position.

The above and other objects and advantages of the invention will be better understood in the light of the following detailed description of a preferred embodiment thereof, which is illustrated by way of example, in the accompanying drawings, in which:

FIG. 2 is a top plan view of the wagon of FIG. 1;

FIG. 5 is a perspective view of the end of a channel member with a pin and a clamping screw associated thereto;

Figure 1:
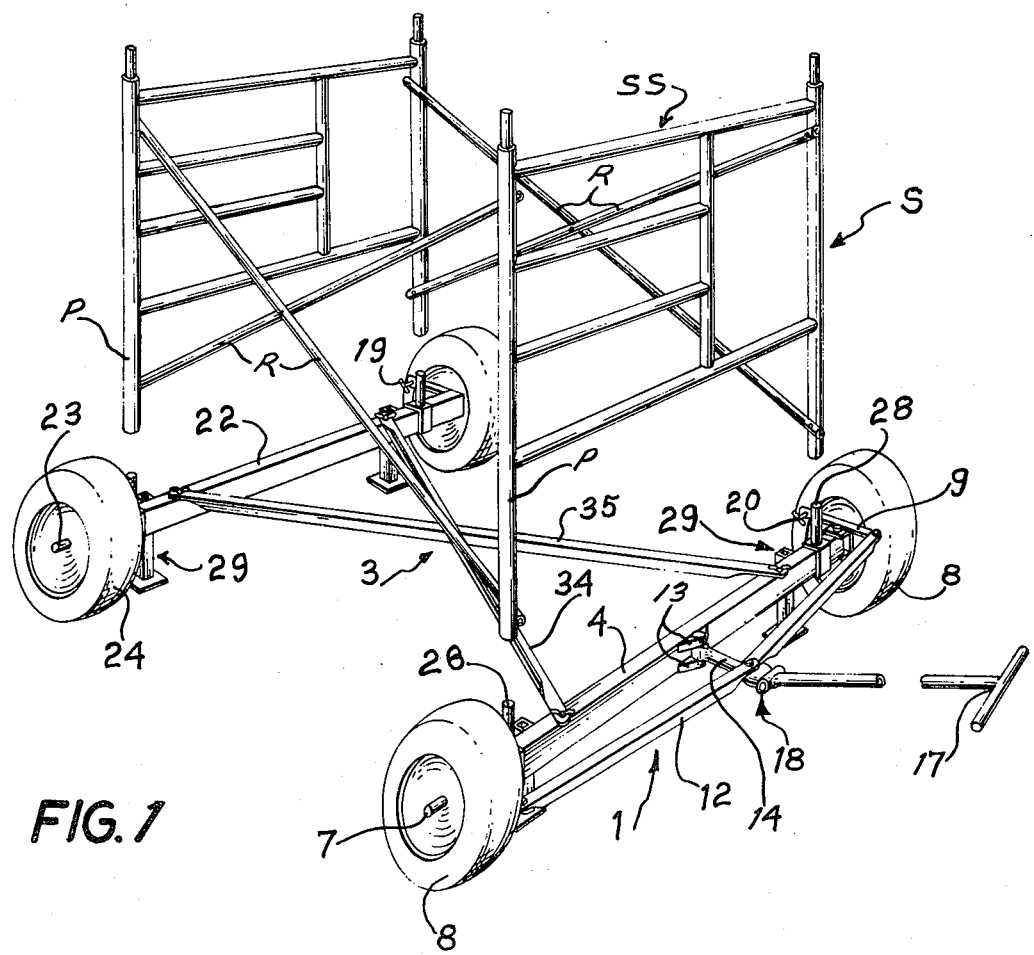
FIG. 1 is a perspective view of a wagon according to the invention with a scaffold in elevated overlying position relative thereto.
Figure 7:
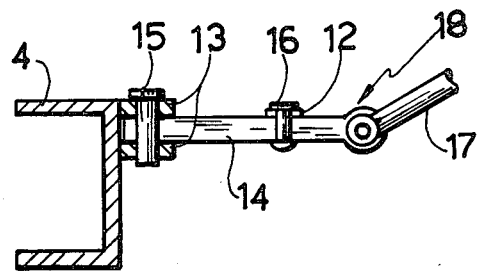
FIG. 7 is a cross-sectional view as seen along line 7—7 in FIG. 2.
Figure 3:
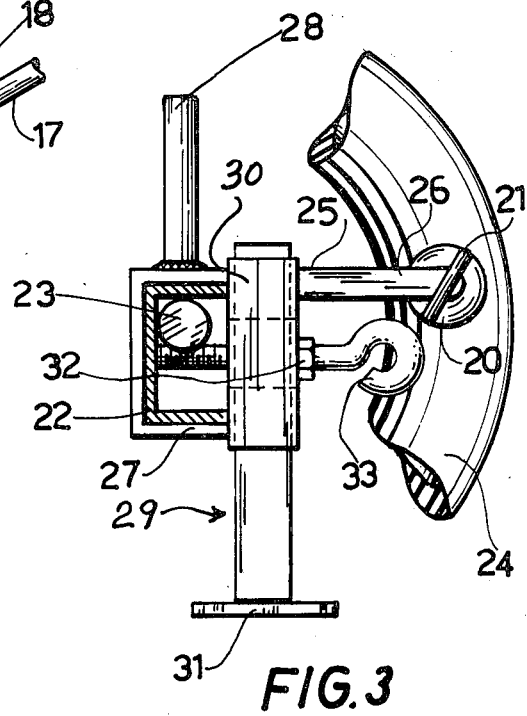
FIG. 3 is a cross-sectional view as seen along line 3—3 in FIG. 2.

The illustrated wagon includes a front wheel and axle assembly 1, a rear wheel and axle assembly 2 and an interconnecting frame 3.

The front wheel and axle assembly 1 includes a channel member 4 extending transversely of the wagon and having the open side thereof facing rearwardly. A C-shaped bracket 5 is pivoted to each end of the channel member 4 by an upright pin 6 defining an upright axis. A stub axle 7 is secured endwise against the outer face of the intermediate portion of each C-shaped bracket 5 and projects laterally away therefrom. A ground-engaging wheel 8 is rotatably mounted in any conventional manner on each stub axle 7 and therefore is allowed to pivot about the upright axis defined by the corresponding pin 6.

Figure 6:
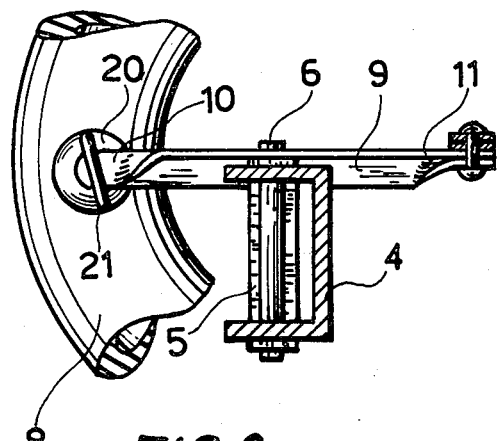
FIG. 6 is a cross-sectional view as seen along line 6—6 in FIG. 2.
Figure 4:
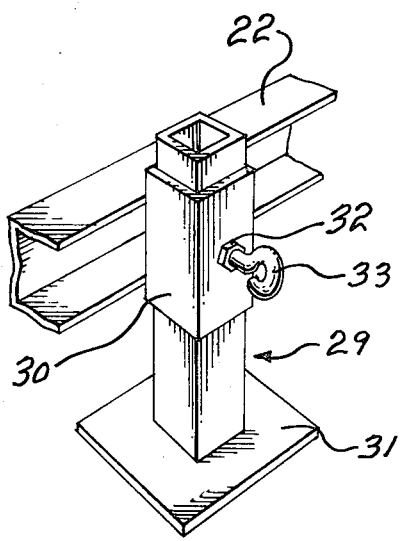
FIG. 4 is a perspective view of a levelling jack forming part of the invention.

An angle bar forming a steering arm 9 is fixedly secured intermediate its length on each C-shaped bracket 5 with its angle exteriorly cornering the upper angle of the corresponding C-shaped bracket 5. As best shown in FIGS. 2 and 6, the angle bar 9 has its rear end 10 flattened into a vertical plane and has its front end 11 flattened into a horizontal plane. A connecting bar, or rod 12, is pivotally connected at its opposite ends to the front ends 11 of the steering bars or arms 9 for symmetrical steering of the latter, as is well known in the art. The connecting bar 12 is also made of angle metal.

A pair of ears, or lugs 13, are welded or otherwise rigidly secured in overlying spaced-apart relationship against the front face of the channel member 4. A draw bar is provided to maneuver the wagon and includes a rear section 14 pivotally connected at one end between the lugs 13 by an upright pin 15 and pivotally connected near the front end to the connecting bar 12 by a pin 16. The draw bar also includes a handle section 17 which is pivoted at its rear end to the rear section 14 by a knuckle joint 18.

A screw 19 is threaded through the flattened rear end 10 of each steering arm or bar 9 and has a clamping disc 20 on the end thereof pointing toward the tire of the corresponding wheel 8 and a transverse bar 21 at the opposite end thereof forming a handle to rotate the clamping screw 19. It may be easily understood that the steering arms 9 pivot with the wheels 8 and the clamping screws thus travel along. Tightening of the screws 19 causes clamping of the discs 20 against the adjoining faces of the tires of the wheels 8. There results a braking of the wagon.

The rear wheel and axle assembly 2 includes a channel member 22 having a pair of stub axles 23 rigidly secured thereto, as by welding, and outwardly projecting from opposite ends thereof. A ground-engaging wheel 24, similar to wheels 8, is conventionally mounted on each stub axle 23.

An angle bar 25 is rigidly secured to each end of the channel member 22 and projects rearwardly therefrom, forming a rear end 26 flattened into a vertical plane. A screw 19 carrying a clamping disc 20 and a bar 21 is threaded through each flattened rear end 26. These screws 19 of the angle bars 25 operate as the preceding screws 19 of the bars 9 to brake the adjoining wheels 24.

A rectangular bracket 27 is engaged around each end of each channel member 4 and 22.

A pin 28 is secured vertically lengthwise on each bracket 27 and is of suitable diameter to engage into the bottom open or female end of a post P of a conventional metal scaffold S. The latter commonly includes a pair of scaffold sections SS held in properly spaced-apart relationship by tie rods R. The brackets 27 on the left-hand side of the wagon are fixedly secured to the corresponding end of the channel members 4 and 22, while the brackets 27 on the right-hand side of the wagon are allowed to slide along the same channel members.

A levelling jack 29 is provided at each end of each channel member 4 and 22 adjacent each pin 28. Each jack 29 includes a section of square tubing 30 rigidly secured, as by welding, against the corresponding end of the corresponding channel member 4 or 22. A longer and smaller section of square tubing 31 is vertically slidable into the square aperture of each tubing section 30 and has a base plate 31 secured at the lower end thereof. A nut 32 is welded against one side of each tubing section 30 and an eye bolt 33 is threaded into each nut 32 and through the corresponding tubing section for adjustable clamping against the corresponding side of the associated smaller tubing 31. Thus, each jack 29 may be adjusted by releasably and adjustably tightening the corresponding eye bolt 33 and vertical sliding of the smaller tube 31. When the jacks are not needed, they may be elevated to an inoperative position, as is well known in the art.

There have now been described two separate wheel assemblies 1 and 2. The latter are disconnectably joined into a wagon configuration by a frame 3 defined by a pair of angle bars 34 and 35, pivoted intermediate their lengths by a pivot 36 and detachably connecting at their opposite ends to the channel members 4 and 22 by wing nuts and bolts.

The wagon is transportable along with the scaffold sections and parts in detached parts wherein the bars 34 and 35 extend alongside each other separate from the assemblies 1 and 2. When at the work site, assemblies 1 and 2 and the bars 34 and 35 are interconnected to form the wagon which is then rolled and steered to the desired location. The levelling jacks 29 are thereafter lowered to their operative upright positions and adjusted, if required, to level the wagon. The clamping screws 19 are tightened to brake the wagon still. The scaffold S, of conventional form, is then erected onto the wagon with the posts P thereof engaging over the pins 28.

The scaffold may thereafter be steered and rolled to another location over uneven terrain where it is again braked and levelled as required. When riding on uneven terrain, the two wheel assemblies 1 and 2 can tilt one relative to the other in a plane perpendicular to the longitudinal axis of the wagon, because of the flexible interconnection constituted by the two angle bars 34 and 35. During tilting of a wheel assembly, one of the pins 28, associated therewith, simply partially withdraws from the tubular post P of scaffold S and the latter remains upright and stable, because it is still supported by the three other posts P.

What we claim is:

1. An erected scaffold transporting wagon comprising a front wheel and axle assembly, a rear wheel and axle assembly, frame means disconnectably joining into a wagon configuration said front and rear assemblies in predetermined spaced parallel relationship and comprising a pair of bars pivoted intermediate their ends and detachably connected at their opposite ends to said front and said rear assemblies, allowing for tilting of either said front or said rear assembly in a plane perpendicular to an axis longitudinal to said wagon configuration, a pair of pins projecting lengthwise upwright in spaced-apart relationship on each of said front and rear assemblies and adapted to removably engage into the bottom opening of tubular legs of a scaffold section, said front wheel and axle assembly including steerable wheels and a steering mechanism connected to said steerable wheels for steering thereof, and a steering control device connected to said steering mechanism and actuating the latter to steer the wagon.

2. A wagon as defined in claim 1, further including at least one bracket mounted onto each axle of said assemblies and transversely displaceable relative to said wagon and one of said pins of each of said pairs of pins rigidly secured to said brackets respectively for adjustable displacement therewith relative to the other pins of said pairs of pins.

3. A wagon as defined in claim 2, further including levelling jacks connected to said assemblies and arranged to level and support said assemblies and a scaffold in erected position on the latter.

4. A wagon as defined in claim 3, further comprising brake means including at least one clamping screw releasably engaging at least one wheel of said wagon and holding the latter still.

5. A wagon as defined in claim 2, wherein each of said axles constitute a channel member, one of said brackets is slidably engaged around each end of each of said channel members, and said pins are rigidly secured to said brackets respectively for sliding adjustment therewith along the corresponding channel members.

6. A wagon as defined in claim 5, further including steerable brackets pivoted about upright axis on the opposite ends of said channel member of said front assembly and stub wheel axles rigidly secured to said steerable brackets and projecting outwardly therefrom laterally of the wagon, a steering arm rigidly secured to each of said steerable brackets and having opposite ends overhanging forwardly and rearwardly thereof, a connecting bar pivotally connected at opposite ends to said forward ends of said steering arms, a draw bar pivotally connected to the channel member of said front assembly and to said connecting bar and projecting forwardly thereof, and a clamping screw projecting through the rear end of each of said steering arms and engageable with the corresponding steerable wheel for braking thereof.

7. A wagon as defined in claim 6, further including stub axles rigidly secured with the flanges of the channel member of said rear assembly and outwardly projecting from opposite ends thereof, an arm rigidly secured to each of the latter and projecting laterally thereof, and a clamping screw projecting through each of said rigid arms and engageable with a corresponding rear wheel of the wagon for braking thereof.

* * * * *